United States Patent
McCarthy et al.

(10) Patent No.: US 11,695,494 B2
(45) Date of Patent: Jul. 4, 2023

(54) FLEXO/ZR ASYNCHRONOUS ADAPTATION USING A VARIABLE LENGTH FRAME

(71) Applicant: Ciena Corporation, Hanover, MD (US)

(72) Inventors: Andrew McCarthy, Ottawa (CA); Sebastien Gareau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 16 days.

(21) Appl. No.: 17/362,339

(22) Filed: Jun. 29, 2021

(65) Prior Publication Data
US 2023/0006759 A1 Jan. 5, 2023

(51) Int. Cl.
*H04B 10/27* (2013.01)
*H04J 14/08* (2006.01)
*H04J 3/16* (2006.01)

(52) U.S. Cl.
CPC .............. *H04J 14/08* (2013.01); *H04B 10/27* (2013.01); *H04J 3/1652* (2013.01)

(58) Field of Classification Search
CPC ....... H04B 10/27; H04B 10/50; H04J 3/1652; H03M 13/458
See application file for complete search history.

(56) References Cited

U.S. PATENT DOCUMENTS

| | | |
|---|---|---|
| 6,986,097 B1 | 1/2006 | Ireland et al. |
| 7,003,708 B1 | 2/2006 | Ireland et al. |
| 7,039,854 B1 | 5/2006 | Ireland et al. |
| 7,058,876 B1 | 6/2006 | Ireland et al. |
| 7,073,117 B1 | 7/2006 | Ireland et al. |
| 7,096,408 B1 | 8/2006 | Ireland et al. |
| 8,306,420 B2 | 11/2012 | Conklin et al. |
| 8,356,233 B2 | 1/2013 | Nichols et al. |
| 8,458,560 B2 | 6/2013 | Nichols |
| 8,718,471 B2 | 5/2014 | Prakash et al. |
| 8,732,358 B2 | 5/2014 | Nichols et al. |
| 8,830,993 B1 | 9/2014 | Dublin et al. |
| 8,867,913 B2 | 10/2014 | Gareau et al. |
| 9,264,139 B2 | 2/2016 | Young et al. |
| 9,825,883 B2 | 11/2017 | Nichols et al. |

(Continued)

FOREIGN PATENT DOCUMENTS

EP  2 983 314 A1  2/2016

OTHER PUBLICATIONS

Mike A. Sluyski, "Open ROADM MSA 3.01 W-Port Digital Specification (200G-400G)", Open ROADM—Draft document, Jun. 25, 2019, pp. 1-56.

(Continued)

*Primary Examiner* — Dzung D Tran
(74) *Attorney, Agent, or Firm* — Baratta Law PLLC; Lawrence A. Baratta, Jr.

(57) ABSTRACT

An asynchronous adaptation process includes receiving a first plurality of frames of a first interface group at a first rate, determining idle/stuffing data to be added in each of the first plurality of frames based on a second rate associated with a second plurality of frames of a second interface group, adding information about the idle/stuffing data in each frame of the first plurality of frames in a preceding frame, and transmitting the second plurality of frames of the second interface group with the idle/stuffing data included therein, wherein the second plurality of frames includes the first plurality of frames with the idle/stuffing data.

20 Claims, 6 Drawing Sheets

(56) References Cited

U.S. PATENT DOCUMENTS

| | | |
|---|---|---|
| 9,980,021 B2 | 5/2018 | Oltman et al. |
| 10,063,336 B1 | 8/2018 | Moynihan et al. |
| 10,135,760 B2 | 11/2018 | Gareau |
| 10,193,688 B2 | 1/2019 | Gareau et al. |
| 10,218,823 B2 | 2/2019 | Gareau |
| 10,225,037 B2 | 3/2019 | Gareau |
| 10,256,909 B2 | 4/2019 | Gareau et al. |
| 10,313,103 B1 | 6/2019 | Perras et al. |
| 10,382,167 B2 | 8/2019 | Gareau et al. |
| 10,396,972 B1 | 8/2019 | Gareau et al. |
| 10,397,088 B2 | 8/2019 | Gareau |
| 10,425,177 B2 | 9/2019 | Gareau et al. |
| 10,498,476 B2 | 12/2019 | Gareau et al. |
| 10,567,352 B2 | 2/2020 | Gareau et al. |
| 10,594,395 B2 | 3/2020 | Abdullah et al. |
| 10,673,782 B2 | 6/2020 | Gareau et al. |
| 10,750,260 B1 | 8/2020 | Gareau |
| 10,826,600 B2 | 11/2020 | Ibach et al. |
| 10,868,662 B2 | 12/2020 | Gareau et al. |
| 10,979,209 B1* | 4/2021 | Sluyski ............... H03M 13/458 |
| 11,438,069 B2* | 9/2022 | Su ........................ H04L 1/0025 |
| 2020/0177361 A1 | 6/2020 | Gareau et al. |
| 2020/0358722 A1 | 11/2020 | Gareau et al. |
| 2020/0396050 A1 | 12/2020 | Perras et al. |
| 2022/0103282 A1* | 3/2022 | Zhang ................... H04J 3/1664 |
| 2022/0103283 A1* | 3/2022 | Zhang ................... H04J 3/1658 |
| 2022/0109519 A1* | 4/2022 | Xiang ................... H04L 1/0084 |

OTHER PUBLICATIONS

Atul Srivastava et al,, "Open ZR+ MSA", Technical Specification, Version 1.0, Sep. 4, 2020, pp. 1-74.

Telecommunication Standardization Sector of ITU, ITU-T G.709. 3/Y.1331.3, "Flexible OTN long-reach interfaces", Jun. 2018, pp. 1-34.

* cited by examiner

FLEXO/ZR ASYNCHRONOUS ADAPTATION USING A VARIABLE LENGTH FRAME

FIELD OF THE DISCLOSURE

The present disclosure generally relates to networking. More particularly, the present disclosure relates to systems and methods for Flexible Optical Transport Network (FlexO)/ZR asynchronous adaptation using a variable length frame.

BACKGROUND OF THE DISCLOSURE

Flexible OTN (hereinafter referred to as FlexO) is defined, e.g., in ITU-T Recommendation G.709.1/Y.1331.1, "Flexible OTN short-reach interface," (06/18), ITU-T Recommendation G.709.3/Y.1331.3, "Flexible OTN long-reach interfaces," (12/20), the contents of each are incorporated by reference. FlexO includes a specific frame structure, which is the same as the 400ZR frame as defined in OIF-400ZR-1.0, Mar. 10, 2020, the contents of which are incorporated by reference. OpenROADM also includes a similar frame structure and OpenROADM is defined in the OpenROADM MSA ver. 4.0, Dec. 7, 2020, the contents of which are incorporated by reference. As described herein, ZR is used to include the 400ZR, ZR+, OpenROADM, etc. specifications. That is, there are various coherent interface specifications being issued and worked on and all of them are contemplated herein.

FlexO is evolving and ITU-T is in the process of discussing new applications. One such application involves capability for a FlexO regenerator, a FlexO extender, a FlexO multiplexer, and/or a FlexO transponder. The implications of such new applications are that the FlexO signal rate must be preserved and asynchronous to the coherent line interface. Various different types of line interfaces (e.g., proprietary, standard Open Forward Error Correction (OFEC), etc.) can be considered.

To preserve the FlexO signal rate, existing solutions include:
  Mapping data into a new frame structure (e.g., Generic Mapping Protocol (GMP)), which includes a new set of overhead, with some overhead fields used to identify the location of the idle/stuffing data.
  Wrapping data into a packet or cell structure, where each packet or cell is either active payload data or idle/stuffing data, and each packet or cell contains overhead identifying which. This is described in commonly-assigned U.S. Pat. Nos. 10,116,403 and 10,498,476, the contents of which are incorporated by reference in their entirety.

The known solutions all add additional overhead, which requires a trade-off between either the line performance or the amount of payload that can be carried.

BRIEF SUMMARY OF THE DISCLOSURE

The present disclosure relates to systems and methods for Flexible Optical Transport Network (FlexO)/ZR asynchronous adaptation using a variable length frame. In particular, an asynchronous FlexO FEC adaptation stage is added as is using information about the amount of idle/stuffing data added to dynamically adjust the length of data over which a sigma delta function operates on a frame-by-frame basis, dynamically adjusting the framer's expected frame period in the same way. Advantageously, this allows a reduced line rate compared to other asynchronous mapping techniques since there is no additional overhead, and is an alternative asynchronous mapping technique to existing ones such as GMP.

In an embodiment, an apparatus includes circuitry configured to receive a first plurality of frames of a first interface group at a first rate, determine idle/stuffing data to be added in each of the first plurality of frames based on a second rate associated with a second plurality of frames of a second interface group, add information about the idle/stuffing data in each frame of the first plurality of frames in a preceding frame, and transmit the second plurality of frames of the second interface group with the idle/stuffing data included therein, wherein the second plurality of frames includes the first plurality of frames with the idle/stuffing data. The idle/stuffing data can be added based on a sigma delta function. An amount of the idle/stuffing data can be different in each frame of the first plurality of frames. The second rate can be slightly larger than the first rate. The information can be added in overhead of the first interface group. The information can be added in Alignment Marker (AM) overhead of the first interface group. The information can be added in multiple locations for a receiver to perform a majority vote. The first plurality of frames and the second plurality of frames can be a Flexible Optical Transport Network (FlexO)/ZR frame. The first interface group can be a FlexO-x-RS-m interface group and the second interface group can be a FlexO-x-DO-m interface group. The first interface group can be a FlexO-x-DO-m interface group and the second interface group can be another FlexO-x-DO-m interface group.

In another embodiment, a method includes receiving a first plurality of frames of a first interface group at a first rate; determining idle/stuffing data to be added in each of the first plurality of frames based on a second rate associated with a second plurality of frames of a second interface group; adding information about the idle/stuffing data in each frame of the first plurality of frames in a preceding frame; and transmitting the second plurality of frames of the second interface group with the idle/stuffing data included therein, wherein the second plurality of frames includes the first plurality of frames with the idle/stuffing data. The idle/stuffing data can be added based on a sigma delta function. An amount of the idle/stuffing data can be different in each frame of the first plurality of frames. The second rate can be slightly larger than the first rate. The information can be added in overhead of the first interface group. The information can be added in Alignment Marker (AM) overhead of the first interface group. The information can be added in multiple locations for a receiver to perform a majority vote. The first plurality of frames and the second plurality of frames can be a Flexible Optical Transport Network (FlexO)/ZR frame. The first interface group can be a FlexO-x-RS-m interface group and the second interface group can be a FlexO-x-DO-m interface group. The first interface group can be a FlexO-x-DO-m interface group and the second interface group can be another FlexO-x-DO-m interface group.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
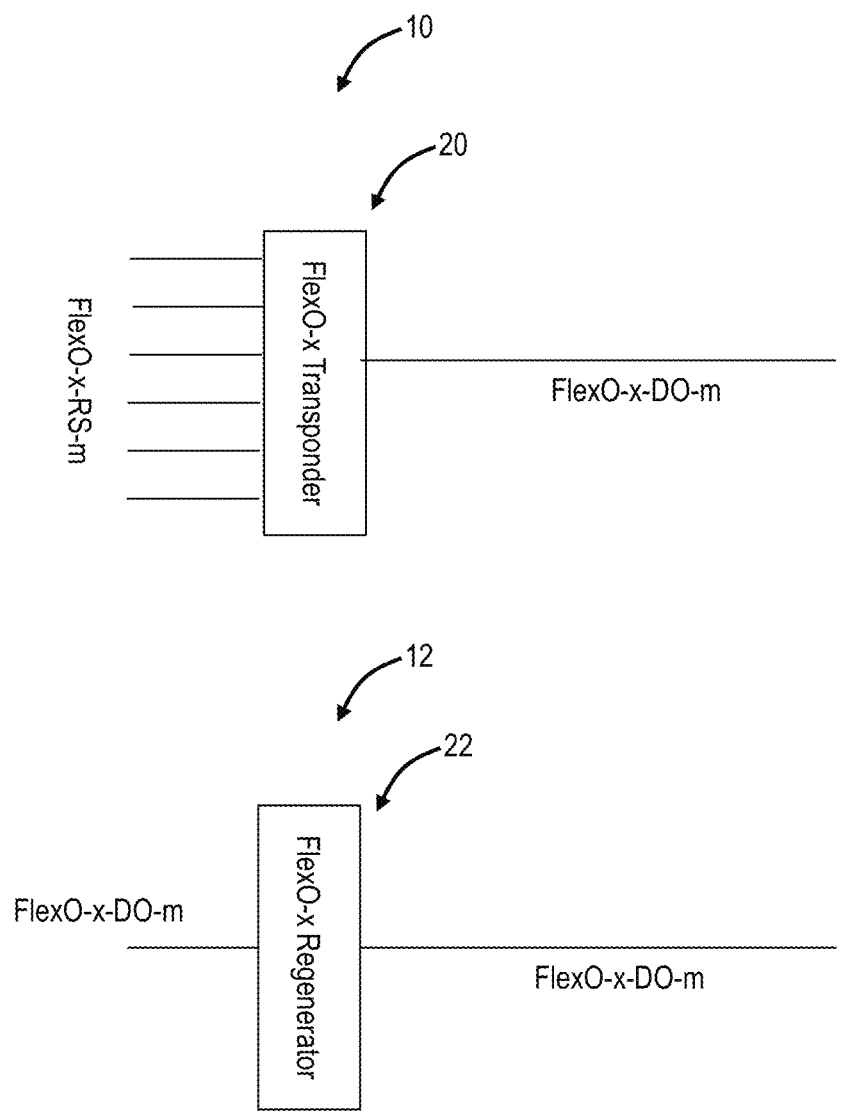
FIG. 1 is a diagram of FlexO asynchronous adaptation applications.

The present disclosure relates to systems and methods for Flexible Optical Transport Network (FlexO)/ZR asynchronous adaptation using a variable length frame. In particular, an asynchronous FlexO FEC adaptation stage is added and is using information about the amount of idle/stuffing data added to dynamically adjust the length of data over which a sigma delta function operates on a frame-by-frame basis, dynamically adjusting the framer's expected frame period in the same way. Advantageously, this allows a reduced line rate compared to other asynchronous mapping techniques since there is no additional overhead, and is an alternative asynchronous mapping technique to existing ones such as GMP.

The following table lists the acronyms used herein

| | |
|---|---|
| AM | Alignment Marker |
| ASIC | Application Specific Integrated Circuit |
| B100G | Beyond 100G |
| BOH | Basic Overhead Area |
| EOH | Extended Overhead Area |
| FEC | Forward Error Correction |
| FlexO | Flexible OTN |
| GMP | Generic Mapping Protocol |
| OFEC | Open FEC |
| OTN | Optical Transport Network |
| OTUCn | Optical Transport Unit order Cn |
| RS | Reed-Solomon |
| TDM | Time Division Multiplexing |
| 3R | Reamplification, Reshaping, Retiming |

The following definitions are used herein from G.709.1:

| | |
|---|---|
| FlexO | Information structure with a specific bit rate and frame format, consisting of overhead and payload, intended to be used in a group with n (n ≥ 1) instances for the transport of an OTUCn signal. |
| FlexO-x | Information structure consisting of x (x ≥ 1) 10-bit interleaved FlexO instances, intended to be used in a group with m (m = ☐n/x☐) instances for the transport of an OTUCn signal. The order x signifies the FlexO-x interface rate in units of 100G. Specific variants are 100G FlexO-1, 200G FlexO-2 and 400G FlexO-4. |
| FlexO-x-RS | Information structure consisting of a FlexO-x plus Reed-Solomon FEC parity. |
| FlexO-x-RS interface | Refers to an individual member interface that is part of a FlexO-x-RS-m interface group. The terms "member" and "PHY" are often used to refer to a FlexO-x interface |
| FlexO-x-RS-m interface group | Refers to the group of m * FlexO-x-RS interfaces. m ≥ 1<br>NOTE - The text may use "FlexO group" as short-hand for FlexO interface group. |

The following definitions are used herein from G.709.3:

| | |
|---|---|
| FlexO-x-DO | Information structure consisting of a FlexO-x that is carried in the payload of a FlexO-x-D<fec> (DSP) frame with Open FEC parity and overhead. |
| FlexO-x-DO interface | Refers to an individual member interface that is part of a FlexO-x-DO-m interface group. |
| FlexO-x-DO-m interface group | Refers to the group of m × FlexO-x-DO interfaces. m ≥ 1<br>NOTE - The text may use "FlexO group" as short-hand for FlexO-x-DO-m interface group. |

The following definitions are used herein from the Open-ROADM MSA:

| | |
|---|---|
| openFEC (OFEC) | a block-based encoder and iterative Soft Decision (SD) decoder. With 3 SD iterations the Net Coding Gain is 11.1 dB @ 10-15 (DP-QPSK) and 11.6 dB @ 10-15 (DP-16QAM), with pre-FEC BER threshold of 2.0 × 10−2. |
| FlexO-x-oFEC | an information structure consisting of a G.709.1 FlexO-x (x = 2, 3, 4) frame structure protected with oFEC. |
| FlexO-x-oFEC signal instance | Refers to an individual Flexo-x-oFEC instance that is part of a FlexO-x-oFEC-m interface group |
| FlexO-x-oFEC-m signal group | Refers to the group of m FlexO-x-oFEC signals |

FIG. 1 is a diagram of FlexO asynchronous adaptation applications 10, 12. The FlexO asynchronous adaptation application 10 includes mapping a FlexO-x-RS-m interface group via a FlexO-x group transponder 20 to a FlexO-x-DO-m interface group. The FlexO asynchronous adaptation application 10 is a multiplexing application. The FlexO asynchronous adaptation application 12 similarly includes mapping a FlexO-x-DO-m interface group via a FlexO-x group 3R regenerator 22 to a FlexO-x-DO-m interface group which is interfaced to a FlexO-x-DO-m.

Variously, these FlexO asynchronous adaptation applications 10, 12 provide a mechanism for FlexO to FlexO signal mapping and it needs to be transparent. The present disclosure includes a process of performing asynchronous FlexO/ZR adaptation, where idle/stuffing data is added using various techniques to adapt a lower rate FlexO/ZR signal to match the rate of a (slightly) higher rate interface, e.g., FlexO-x-RS-m interface group (lower rate) to FlexO-x-DO-m interface group (higher rate). The process centers around the identification of the idle/stuffing data to allow data recovery by a receiver.

Figure 2:
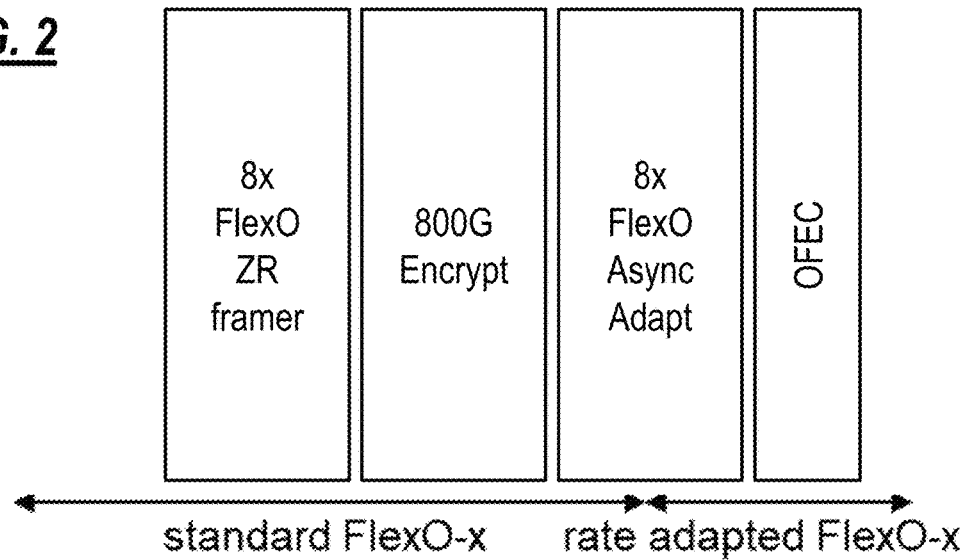
FIG. 2 is a diagram of rate adaptation of a FlexO/ZR signal into a FEC wrapper.
Figure 3:
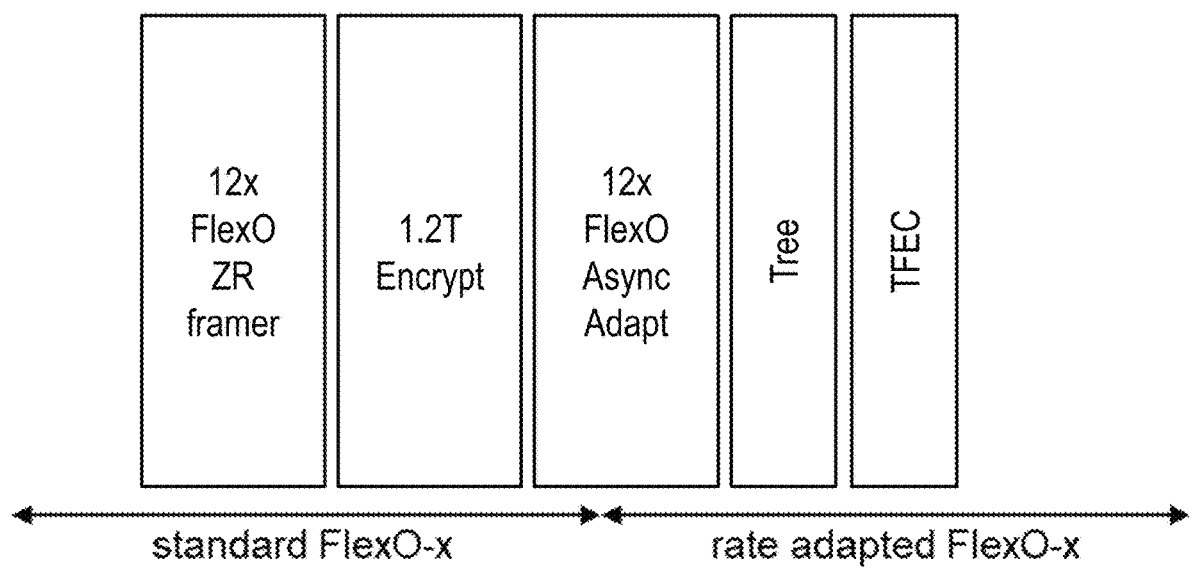
FIG. 3 is a diagram of rate adaptation of a FlexO/ZR signal into a probabilistic shaping algorithm and proprietary FEC.
Figure 4:
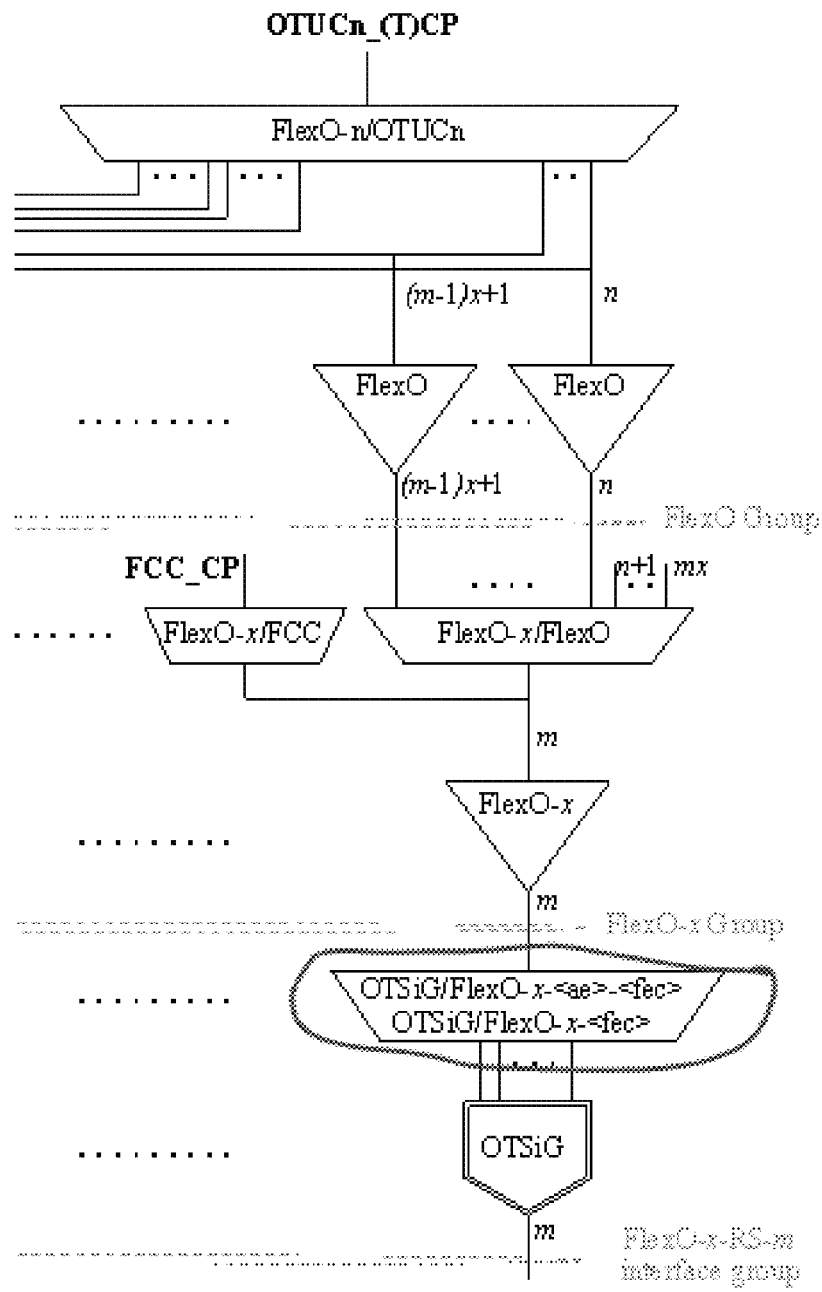
FIG. 4 is a diagram of asynchronous adaptation of what ITU-T calls the FEC adaptation function.

The process can be used to rate adapt a FlexO/ZR signal into a FEC wrapper, such as illustrated in FIG. 2. The process can similarly be used to rate adapt a FlexO/ZR signal into a probabilistic shaping algorithm and proprietary FEC, such as illustrated in FIG. 3. The disclosed process provides an asynchronous adaptation of what ITU-T calls the FEC adaptation function as circled in the functional diagram of FIG. 4.

Conventional approaches, such as a sigma-delta distribution of the idle/stuffing data, provide ways of identifying whether or not the data is idle/stuffing data at a particular distance from boundary (such as frame boundary). But this traditionally operates over a fixed length of data, and conventional approaches add their own frame structure and overhead to make the post-stuffing frame a fixed duration.

Figure 5:
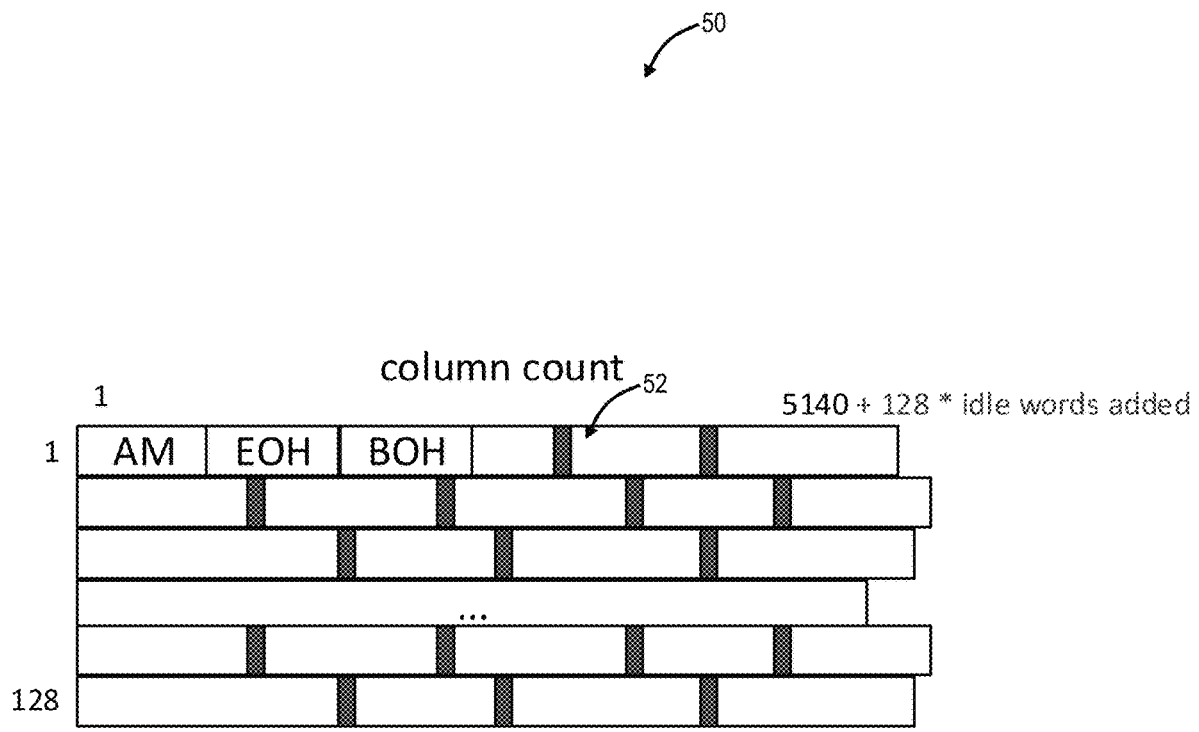
FIG. 5 is a diagram of a FlexO-x frame with idle/stuff words included therein.

FIG. 5 is a diagram of a FlexO-x frame 50 with idle words 52 included therein. The asynchronous adaptation process is described herein using a FlexO/ZR frame. Of course, it could be applied to other type of frame/TDM structures. The asynchronous adaptation process requires no overhead to be added because it uses the existing frame boundary (modified by the amount of idle data/stuffing sent) and sends information by re-purposing existing overhead. In FIG. 5, the frame size is variable based on amount of stuffing injected.

The asynchronous adaptation process uses an existing frame marker (based on FlexO/ZR frame), which means no addition of overhead is necessary. However, complications arise when using an existing marker because the idle// stuffing data added, the quantity of which will vary from frame to frame, changes the amount of data between frame boundaries. The sigma-delta distribution and the receiver's framer expect a fixed duration to the next frame boundary.

The present disclosure resolves these issues by sending the information about the number of idles/stuffing added a frame in advance and uses this information at the receiver to dynamically adjust the length of data over which the sigma-delta distribution and framer act on a frame-by-frame basis. This data is sent by being aware of the protocol whose rate is being adapted and repurposing its existing overhead. Reserved or other unused fields or may be used to send this information. There are various reserved locations in the FlexO/ZR frame that could be used for such purpose, but it is preferred to be before the encryption processes since the information must be cleartext for the framing algorithms as described above. It also must not be possible to insert idle/stuffing data must between the frame pattern and the information sent about the amount of idle data added to this frame period, otherwise the receiver does not know where to look for that key information. This means re-purposing some of the AM of the FlexO frame is ideal.

Figure 6:
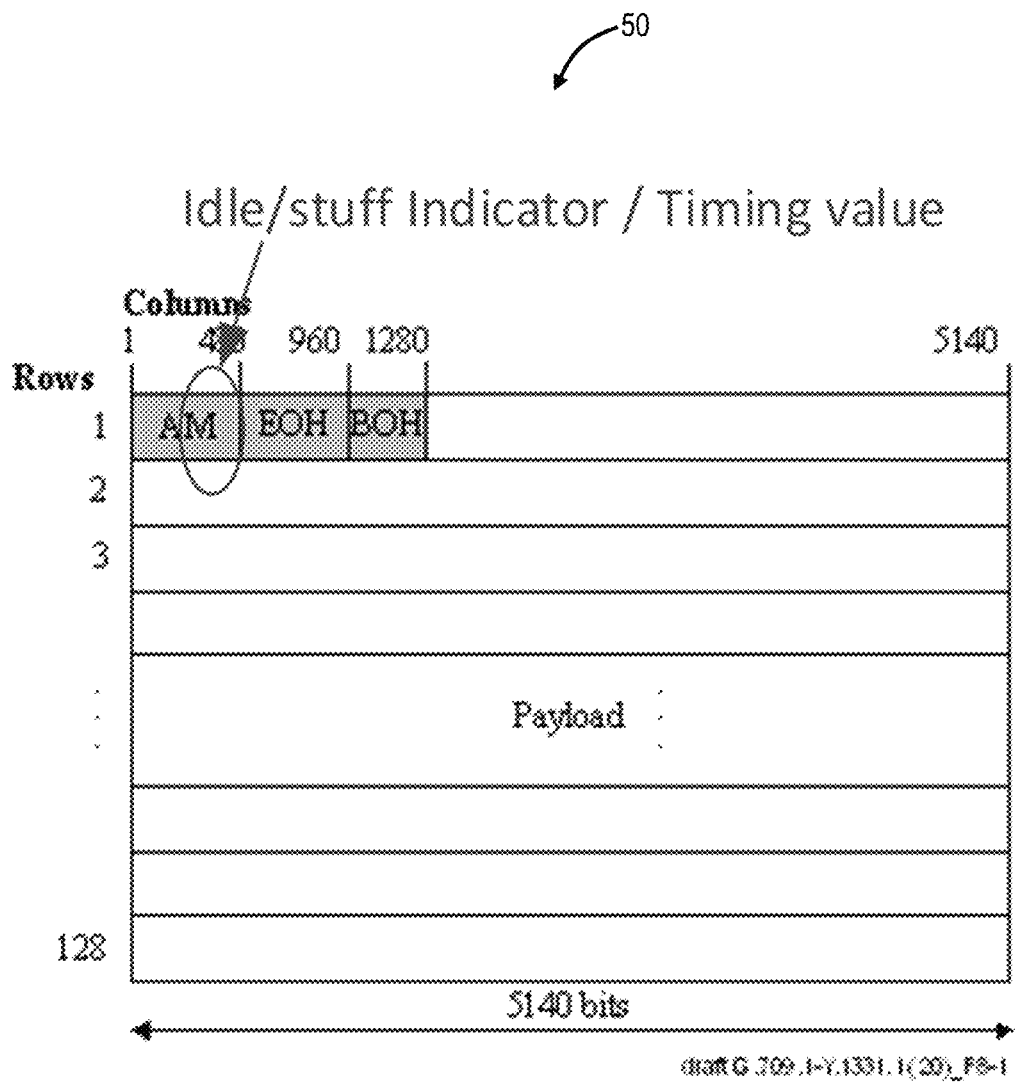
FIG. 6 is a diagram of a FlexO-x frame with a idle/stuff indicator/timing value included therein in the AM.

FIG. 6 is a diagram of a FlexO-x frame 50 with a stuff indicator/timing value included therein in the AM. Note that the information about the number of idles/stuffing added can also be used as distinct timing information.

Error correction could be performed on the sigma-delta information sent, such as by sending that data multiple times (e.g., 3 times) and performing a majority vote. This will be highly desired for robust communication because a corruption in the information sent will cause significant errors on recovery (loss of frame and corruption of extracted data).

Figure 7:
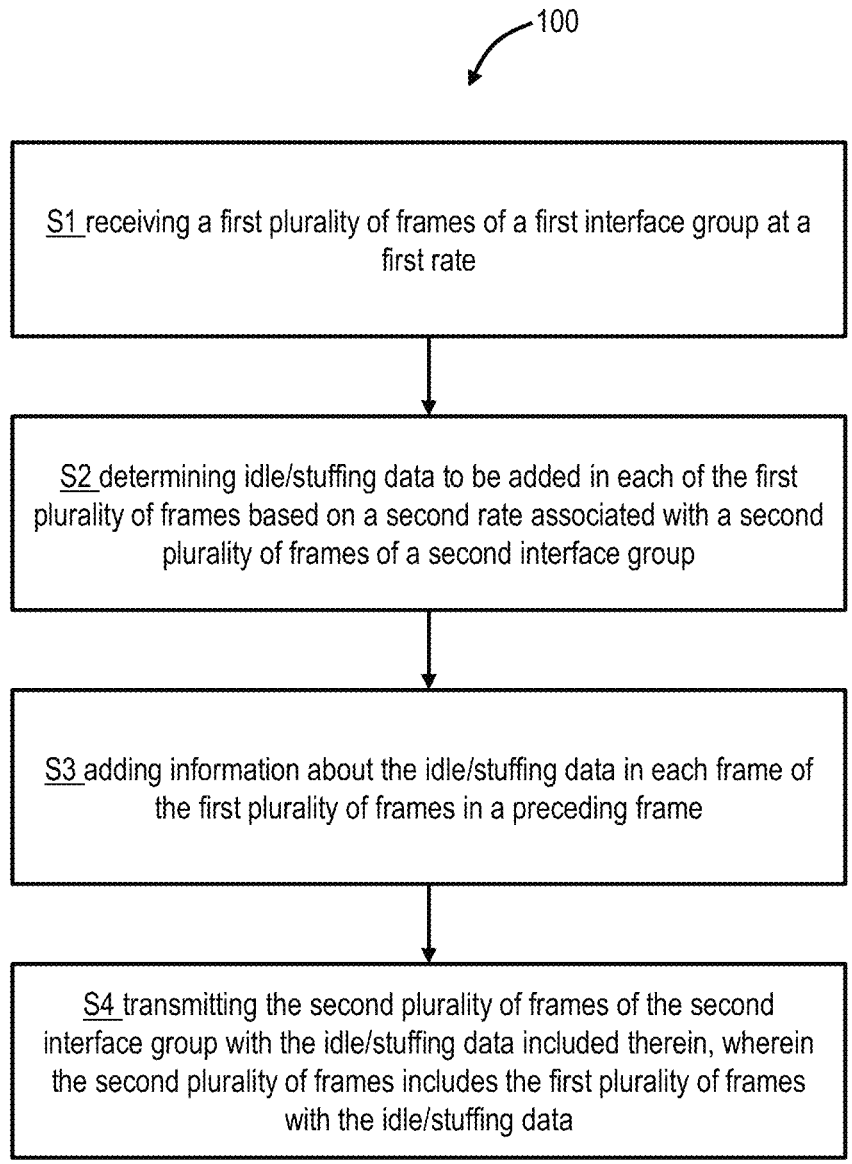
FIG. 7 is a flowchart of an asynchronous adaptation process.

FIG. 7 is a flowchart of an asynchronous adaptation process 100. The asynchronous adaptation process 100 can implemented as a method and via circuitry.

The asynchronous adaptation process 100 includes receiving a first plurality of frames of a first interface group at a first rate (step S1), determining idle/stuffing data to be added in each of the first plurality of frames based on a second rate associated with a second plurality of frames of a second interface group (step S2), adding information about the idle/stuffing data in each frame of the first plurality of frames in a preceding frame (step S3), and transmitting the second plurality of frames of the second interface group with the idle/stuffing data included therein, wherein the second plurality of frames includes the first plurality of frames with the idle/stuffing data (step S4). As described herein, a preceding frame means any previous frame including the most recent frame. If the second interface group has m>1, i.e., multiple interfaces, then the preceding frame is in frames of the same interface group member.

The first interface group can be a FlexO-x-RS-m interface group and the second interface group can be a FlexO-x-DO-m interface group. The first interface group can be a FlexO-x-DO-m interface group and the second interface group can be another FlexO-x-DO-m interface group.

The idle/stuffing data can be added/distributed based on a sigma delta function. An amount of the idle/stuffing data can be different in each frame of the first plurality of frames. The receiving end can adjust the sigma-delta calculation period and the framer's expected frame period dynamically on a frame-by-frame basis based on the received information. The second rate is slightly larger than the first rate.

The information can be added in overhead of the second interface group. The information can be added in Alignment Marker (AM) overhead of the second interface group. The information can be added in multiple locations for a receiver to perform a majority vote. The first plurality of frames and the second plurality of frames can be a Flexible Optical Transport Network (FlexO)/ZR frame.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application- Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. An apparatus comprising circuitry configured to:
   receive a first plurality of frames of a first interface group at a first rate,
   determine idle/stuffing data to be added in each of the first plurality of frames based on a second rate associated with a second plurality of frames of a second interface group,
   add information about the idle/stuffing data in each frame of the first plurality of frames in a preceding frame for recovery by a receiver, wherein the second plurality of frames each include a variable frame length, and
   transmit the second plurality of frames of the second interface group with the idle/stuffing data included therein, wherein the second plurality of frames includes the first plurality of frames with the idle/stuffing data.

2. The apparatus of claim 1, wherein the idle/stuffing data is added based on a sigma delta function.

3. The apparatus of claim 1, wherein an amount of the idle/stuffing data is different in each frame of the first plurality of frames.

4. The apparatus of claim 1, wherein the second rate is slightly larger than the first rate.

5. The apparatus of claim 1, wherein the information is added in overhead of the first interface group.

6. The apparatus of claim 1, wherein the information is added in Alignment Marker (AM) overhead of the first interface group.

7. The apparatus of claim 1, wherein the information is added in multiple locations for a receiver to perform a majority vote.

8. The apparatus of claim 1, wherein the first plurality of frames and the second plurality of frames are a Flexible Optical Transport Network (FlexO)/ZR frame.

9. The apparatus of claim 1, wherein the first interface group is a FlexO-x-RS-m interface group and the second interface group is a FlexO-x-DO-m interface group.

10. The apparatus of claim 1, wherein the first interface group is a FlexO-x-DO-m interface group and the second interface group is another FlexO-x-DO-m interface group.

11. A method comprising:
    receiving a first plurality of frames of a first interface group at a first rate;
    determining idle/stuffing data to be added in each of the first plurality of frames based on a second rate associated with a second plurality of frames of a second interface group;
    adding information about the idle/stuffing data in each frame of the first plurality of frames in a preceding frame for recovery by a receiver, wherein the second plurality of frames each include a variable frame length; and
    transmitting the second plurality of frames of the second interface group with the idle/stuffing data included therein, wherein the second plurality of frames includes the first plurality of frames with the idle/stuffing data.

12. The method of claim 11, wherein the idle/stuffing data is added based on a sigma delta function.

13. The method of claim 11, wherein an amount of the idle/stuffing data is different in each frame of the first plurality of frames.

14. The method of claim 11, wherein the second rate is slightly larger than the first rate.

15. The method of claim 11, wherein the information is added in overhead of the first interface group.

16. The method of claim 11, wherein the information is added in Alignment Marker (AM) overhead of the first interface group.

17. The method of claim 11, wherein the information is added in multiple locations for a receiver to perform a majority vote.

18. The method of claim 11, wherein the first plurality of frames and the second plurality of frames are a Flexible Optical Transport Network (FlexO)/ZR frame.

19. The method of claim 11, wherein the first interface group is a FlexO-x-RS-m interface group and the second interface group is a FlexO-x-DO-m interface group.

20. The method of claim 11, wherein the first interface group is a FlexO-x-DO-m interface group and the second interface group is another FlexO-x-DO-m interface group.

* * * * *